United States Patent
Cain

[11] 3,807,432
[45] Apr. 30, 1974

[54] PRESSURE RELIEF VALVE FOR BICYCLE TIRES

[76] Inventor: Robert W. Cain, 8479 Suncrest Dr., Dallas, Tex. 72228

[22] Filed: Nov. 14, 1972

[21] Appl. No.: 306,200

[52] U.S. Cl.................. 137/224, 137/228, 137/539
[51] Int. Cl............................................ F16k 37/00
[58] Field of Search .......... 137/224, 227, 230, 539, 137/228

[56] References Cited
UNITED STATES PATENTS

| | | | |
|---|---|---|---|
| 2,004,822 | 6/1935 | Mercier | 137/224 |
| 1,732,918 | 10/1929 | Sutton | 137/230 X |
| 2,954,796 | 10/1960 | Marshall | 137/539 X |
| 1,215,782 | 2/1917 | Diamond | 137/224 |
| 3,720,224 | 3/1973 | Foxhall | 137/227 |
| 1,144,499 | 6/1915 | Owens | 137/224 |

Primary Examiner—Harold W. Weakley
Attorney, Agent, or Firm—Richards, Harris & Medlock

[57] ABSTRACT

The specification is directed to a pressure relief valve for attachment between the end of a pressurized air hose and the valve stem of a pneumatic bicycle tire. The valve includes a unitary body constructed of thermoplastic material in a generally triangular configuration. A passageway extends through the unitary body and may include a first threaded connection for attachment to the end of the pressurized air hose and a second threaded connection for attachment to the valve stem of the bicycle tire. The unitary plunger is free to move within the passageway and has a length sufficient to actuate the valve in the bicycle valve stem in order to enable inflation of the bicycle tire. A relief conduit communicates with the passageway and a check valve is disposed in the relief conduit for opening upon the occurrence of a predetermined pressure to vent excess pressurized air to the atmosphere to prevent over-inflation of the bicycle tire.

3 Claims, 2 Drawing Figures

PATENTED APR 30 1974 3,807,432

PRESSURE RELIEF VALVE FOR BICYCLE TIRES

BACKGROUND OF THE INVENTION

1. Field of the Invention

This invention relates to the inflation of pneumatic tires and more particularly relates to a pressure relief device to prevent over-inflation of pneumatic bicycle tires.

2. The Prior Art

During the inflation of pneumatic tires, care must be taken not to over-inflate the tires. In particular, the recent widespread use of multispeed bicycles has resulted in the need for over-inflation protective devices, as such bicycle tires require a relatively high air pressure but a low volume of air. If such multispeed bicycle tires are inflated with any device other than a hand pump, a possibility exists that the tires will rupture, thereby requiring tube and possibly tire replacement, as well as possibly resulting in bodily injury.

In the early days of automobiles, a plurality of mechanical devices were developed to prevent over-inflation of the small tires then utilized on automobiles. An example of such devices are disclosed in U.S. Pat. No. 511,706, issued to Lamplugh et al.; U.S. Pat. No. 1,144,499, issued to Owens et al.; U.S. Pat. No. 1,160,050, issued to Dalton; U.S. Pat. No. 1,175,208, issued to Vosler; and U.S. Pat. No. 1,375,429, issured to Van Camp. However, such prior art safety devices often required the disassembly of the valve stem of the tire and the insertion of a portion of the tire valve into the safety device. Additionally, such prior art over-inflation protection devices were relatively complex in their construction and operation, thereby preventing their wide-spread use in environments wherein low cost and ease of operation and maintenance were desirable.

SUMMARY OF THE INVENTION

In accordance with the present invention, an over-inflation device is provided which is particularly advantageous for use with bicycle tires and the like due to its low cost, ease of use and ruggedness of construction.

In accordance with one respect of the invention, a pressure relief valve is provided for use with pneumatic tires having a valve stem which includes a unitary body having a passageway extending therethrough. A first end of the passageway is configured to be connected to the end of a pressurized air hose and the second end of the passageway is configured to be connected to the valve stem of the pneumatic tire. A unitary plunger is freely movable within the passageway and has a length sufficient to open the valve in the tire valve stem when the plunger is depressed by the end of the air hose. A relief conduit is formed through the body and communicates at one end with the passageway and at the other end with the atmosphere. A check valve is disposed in the relief conduit and is operable to open upon the occurrence of a predetermined air pressure in the passageway to vent additional pressurized air to the atmosphere.

In accordance with another aspect of the present invention, a pressure relief valve is provided for attachment between the end of an air hose and the valve stem of a bicycle tire. The valve device includes a unitary body having a generally triangular configuration and having a width less than the width of the bicycle tire. Exterior threads are formed in the apex region of the triangular body for connection to the end of the pressurized air hose. Interior threads are formed in the base of the region of the triangular body for connection to the valve stem of the bicycle tire. A passageway extends through the body between the interior and exterior threads. A plunger is movable within the passageway to enable inflation of the bicycle tire by pressurized air from the air hose. A relief conduit extends from the middle region of the passageway toward the base of the triangular body at an acute angle, with a relief slot being formed along an edge portion of the relief conduit. A check valve is disposed between the relief conduit and the relief slot and is operable upon the occurrence of a predetermined air pressure in the passageway to vent excess pressurized air to the atmosphere.

DESCRIPTION OF THE DRAWINGS

For a more complete understanding of the present invention and for further objects and advantages thereof, reference is now made to the following description taken in conjunction with the accompanying drawings, in which.

DESCRIPTION OF THE PREFERRED EMBODIMENT

Figure 1:
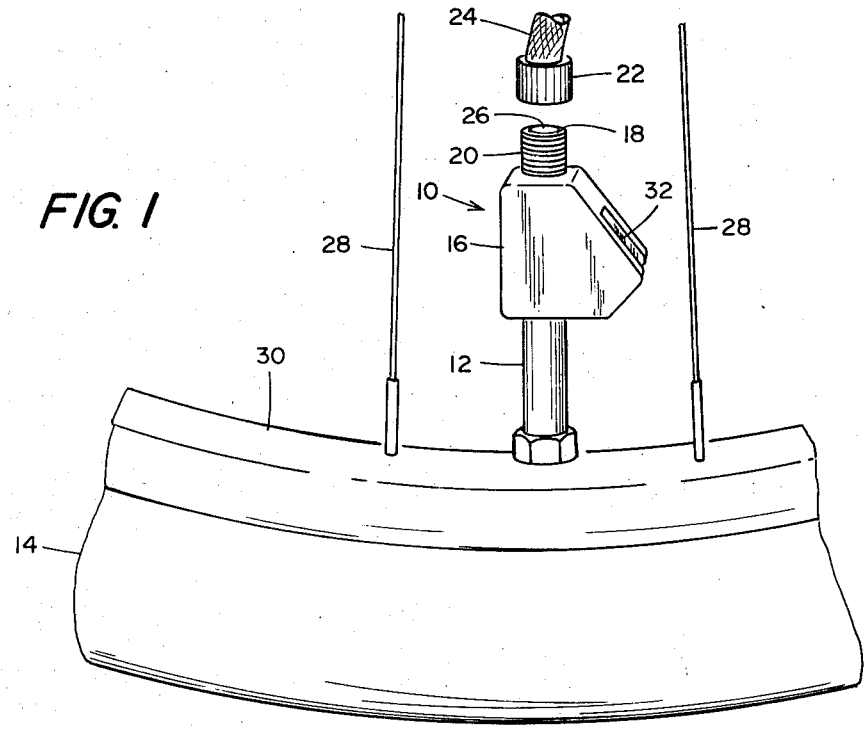
FIG. 1 is a perspective view of the present pressure relief valve when attached to a bicycle tire.

FIG. 1 illustrates the pressure relief valve 10 of the invention attached to the valve stem 12 of a conventional bicycle pneumatic tire 14. The device 10 comprises a unitary body 16 having a somewhat triangular configuration, with a cylindrical extension 18 formed at the apex region of the triangular configuration. Exterior threads 20 are formed about the extension 18 in order to be threadedly connected to the end 22 of a conventional pressurized air hose 24. It should however be understood that the present device may be used with the type of air hose generally found in service stations and the like in which case the threads 20 would not be necessary. A plunger 26, to be subsequently described, is disposed through the extension 18 and extends through the body 16 to open the Schrader valve normally found in the valve stem 12 of a bicycle tire in order to enable inflation of the tire 14.

The body 16 is provided with the generally triangular configuration. The width of the body 16 is relatively narrow and is narrower than the rim 30 of the bicycle tire in order that the device 10 may be disposed between the spokes 28 and permanently attached to the valve stem 12 during use of the bicycle. A relief slot 32 is formed along one edge of the body 16 to vent excessive pressurized air to the atmosphere to prevent over-inflation of the tire 14.

The body 16 of the device 10 may be very economically constructed by injection molding or the like from a thermoplastic material such as Noryl. As will be subsequently described, the remaining components of the device may be very inexpensively made and provide a very rugged construction to enable use of the device during normal operation of a bicycle.

Figure 2:
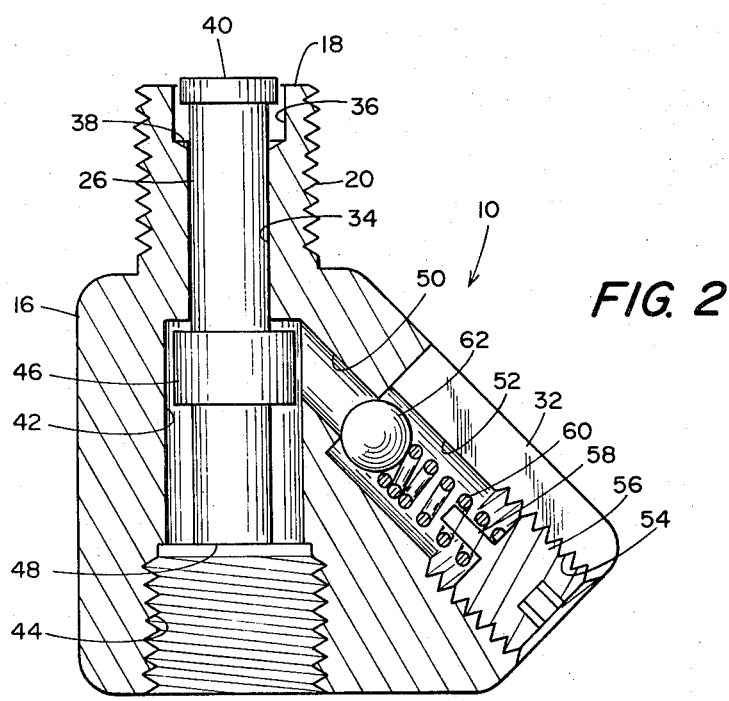
FIG. 2 is a sectional view taken through the pressure relief valve shown in FIG. 1.

FIG. 2 illustrates in detail the interior construction of the device 10. A passageway 34 extends through the body 16, with a counterbore 36 being formed at the upper end of the passageway 34 in the extension 18. Vent slots 38 are formed in the bottom of the counterbore 36. An enlarged section 40 of the plunger 26 abuts with the annular shoulder formed by the counterbore 36 to retain and limit the downward travel of the plunger 26. The vent slots 38 enable the passage of pressurized air through the passageway 34 when the plunger 26 is fully downwardly depressed.

A second counterbore 42 is formed in the lower end of the passageway 34 and a set of interior threads 44 are formed at the end of the counterbore in order to receive the threads of a conventional valve stem of a bicycle tire. The plunger 26 includes an enlarged portion 46 which abuts with the annular shoulder formed by the counterbore 42 to limit the upward travel of the plunger 26. It may be seen that the plunger 26 is thus freely movable along the passageway 34, but is limited in travel by the enlarged portions 40 and 46. The plunger 26 is of sufficient length such that upon depression of the plunger 26 caused by the connection or attachment of the end of a pressurized air hose to the extension 18, the lower portion 48 of the plunger 26 opens the Schrader valve in the valve stem of the bicycle tire to enable inflation of the bicycle tire.

A relief conduit 50 communicates at one end with the passageway 34 and includes a counterbore 52 at the end thereof. Interior threads 54 are defined at the end of the counterbore to enable attachment of a relief set screw 56 therein. A projection 58 of the set screw 56 maintains a spring 60 in place within the counterbore 52. The end of the spring 60 normally biases a ball 62 against the annular shoulder of the counterbore 52 to provide a check valve assembly which normally maintains the relief conduit 50 closed. The relief slot 32 communicates the counterbore 52 with the atmosphere. Thus, upon the existence of a predetermined air pressure within the passageway 34, the ball 62 is moved against the spring 60 to vent excessive pressurized air through the relief conduit 50 and out the relief slot 32 to the atmosphere. The relief set screw 56 may be adjusted along the threads 54 in order to predetermine the magnitude of air pressure at which the ball 62 is moved against the spring 60, so that the desired pressure within the bicycle tire may be predetermined. If desired, the spring 60 may be chosen such that the spring oscillates upon air flow therethrough to generate an audible whistle to notify the operator that the tire is filled.

The relief conduit 50 is disposed at an acute angle relative to the passageway 34 to enable the use of a relatively long spring 60. If the conduit 50 were disposed at a right angle to the passageway 34, the conduit 50 and the spring 60 would be required to be relatively short, and problems might occur during production in maintaining the necessary tolerances required for the spring tension characteristics. With the use of the longer conduit 50 as shown in FIG. 2, the spring tension tolerances may be easily maintained during mass production.

In operation of the device, the end of the valve stem 12 is screwed into the threaded portion 44 of the body 16. The device is then firmly connected to the bicycle tire and may be maintained in place during the normal operation of the bicycle. When it is desired to inflate the tire, the end 22 of a conventional pressurized air hose 24 is connected over the threads 20 of the extension 18. The plunger 26 is forced downwardly by the end of the air hose and actuates the Schrader valve within the valve stem 12 of the bicycle tire. Pressurized air then passes through the air hose and through the passageway 34 in order to inflate the tire. When a predetermined pressure, as determined by the setting of the relief set screw 56, is reached, the ball 62 is moved out of abutment with the annular shoulder of the counterbore 52, thereby venting excessive pressurized air through the relief conduit 50 and out the relief slot 32 to the atmosphere. The hissing noise created by the passage of air through relief slot 32 notifies the operator that a sufficient amount of air has been added to the bicycle tire 14. The air hose may be disconnected from the device and the tire is then inflated to the desired pressure.

Whereas the present invention has been described with respect to specific embodiments thereof, it will be understood that various changes and modifications will be suggested to one skilled in the art, and it is intended to encompass such changes and modifications as fall within the scope of the appended claims.

What is claimed is:

1. A pressure relief valve for attachment to the valve stem of a bicycle tire in order to prevent pressurization of said tire above a predetermined pressure comprising:

a unitary thermoplastic body having a generally triangular configuration and having a cylindrical end with exterior threads formed thereon to enable connection of said body to the end of a pressurized air hose, a circular passageway extending through said cylindrical end and through the remainder of said body, first and second counterbores being formed in opposite ends of said passageway, threads formed in one of said counterbores for receiving a valve stem, a unitary plunger disposed within said passageway and including spaced apart annular shoulders for abutting with surfaces of said counterbores to limit the travel of said plunger within said passageway, said plunger having a first end for abutting with the end of said air hose and further having a second end for abutting with a valve in a valve stem, a relief conduit in said body extending at an acute angle from said passageway and having a counterbore defining an annular shoulder in the end thereof remote from said passageway, an elongated slot being formed along a side portion of said conduit to communicate the atmosphere to said conduit, a plug for blocking the end of said counterbore remote from said passageway, a spring within said counterbore and abutting against the inner end of said blocking plug, said slot having a thickness less than the width of said spring to prevent escape of said spring, and a ball biased by said spring against said annular shoulder, said ball movable from said annular shoulder upon the occurrence of a predetermined pressure within said passageway for venting excess pressure to the atmosphere through said slot.

2. The pressure relief valve of claim 1 and further comprising:

means for generating an audible sound when said pressurized air is vented through said biased ball.

3. The pressure relief valve of claim 1 wherein said plug includes threads to allow adjustment within said counterbore to vary said predetermined pressure.

\* \* \* \* \*